United States Patent
Kemmler et al.

(10) Patent No.: US 8,473,867 B2
(45) Date of Patent: Jun. 25, 2013

(54) CONFLICT SWITCHES FOR IMPLEMENTATION GUIDE NODE CHANGES

(75) Inventors: Andreas Kemmler, Boenigheim (DE); Torsten Kamenz, Weisloch (DE)

(73) Assignee: SAP AG, Walldorf (DE)

( * ) Notice: Subject to any disclaimer, the term of this patent is extended or adjusted under 35 U.S.C. 154(b) by 276 days.

(21) Appl. No.: 12/952,688

(22) Filed: Nov. 23, 2010

(65) Prior Publication Data

US 2012/0131457 A1    May 24, 2012

(51) Int. Cl.
G06F 15/00    (2006.01)
G06F 13/00    (2006.01)

(52) U.S. Cl.
USPC .......................................... 715/853; 715/851

(58) Field of Classification Search
USPC ......... 715/734–736, 741, 851–853, 763–765, 715/840–841
See application file for complete search history.

(56) References Cited

U.S. PATENT DOCUMENTS

| | | | |
|---|---|---|---|
| 6,731,625 B1* | 5/2004 | Eastep et al. | 370/352 |
| 6,826,616 B2* | 11/2004 | Larson et al. | 709/228 |
| 2008/0095339 A1* | 4/2008 | Elliott et al. | 379/93.01 |

* cited by examiner

Primary Examiner — Cao "Kevin" Nguyen
(74) Attorney, Agent, or Firm — Kenyon & Kenyon LLP

(57) ABSTRACT

An enhancement implementation analysis method and system are provided. A processor may determine a node in an implementation guide hierarchy to be analyzed for conflicts. Based on the determination, a list of all switches assigned to the node in the implementation guide hierarchy may be retrieved from a data store. The list of retrieved switches may be checked by a processor to determine whether the switch is an active conflict switch. Upon a determination that the conflict switch is an inactive conflict switch, the conflict switch may be deleted from the retrieved list of all switches. If the conflict switch is determined to be an active conflict switch, the conflict switch may be added to a list of relevant switches, and the list of relevant switches may be processed to resolve conflicts, and a corresponding implementation guide may be presented.

14 Claims, 8 Drawing Sheets

100

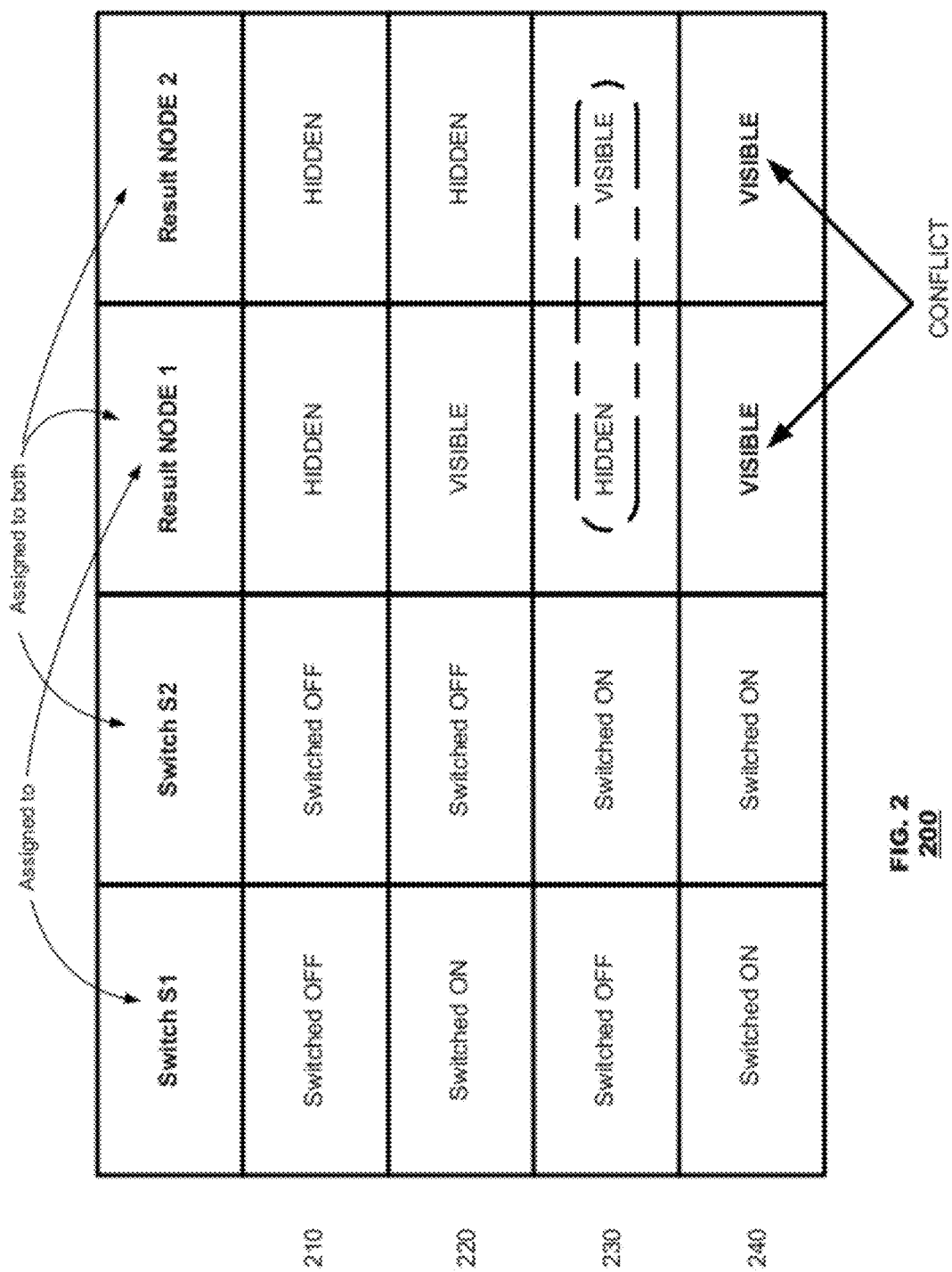

300

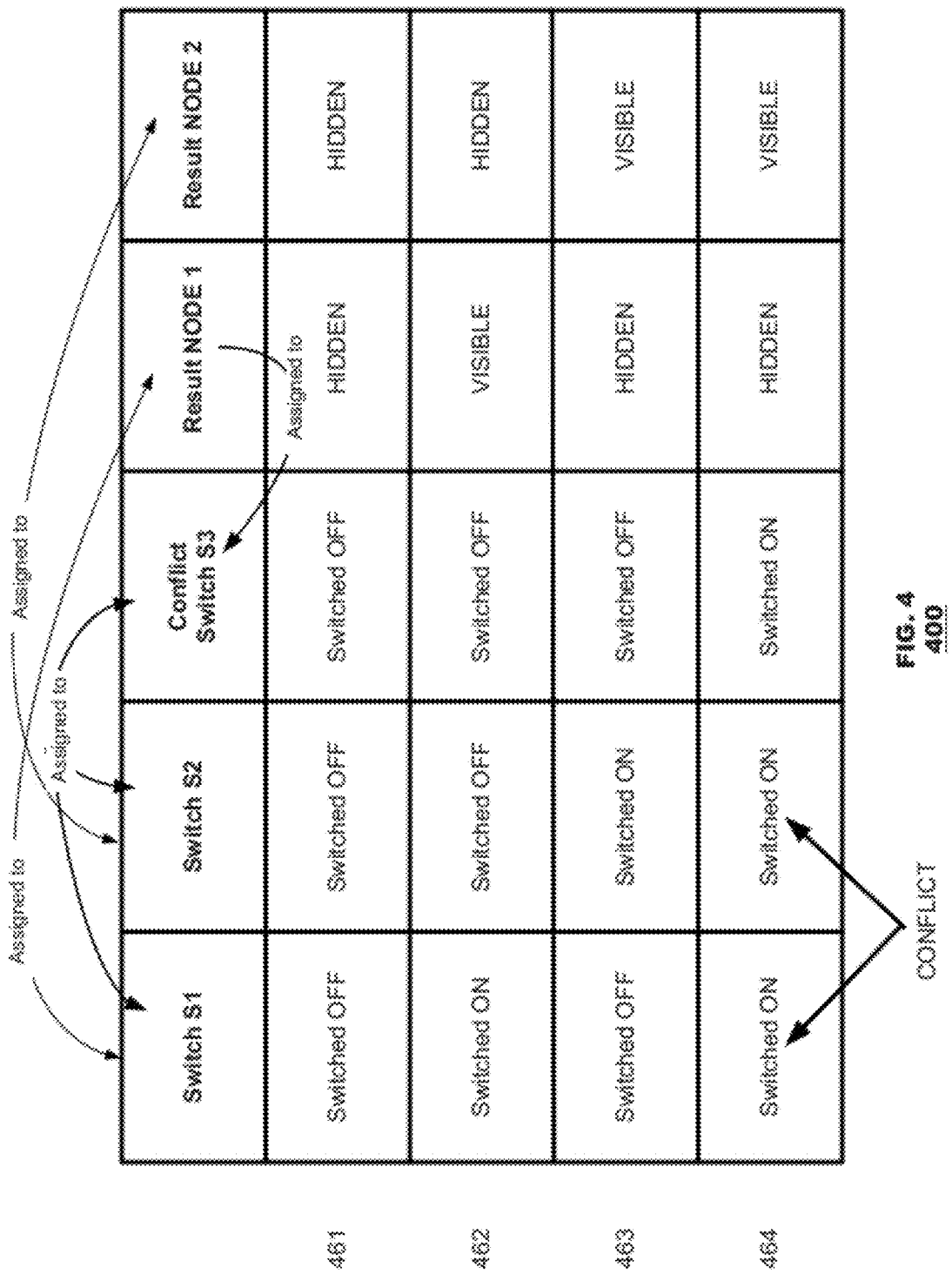

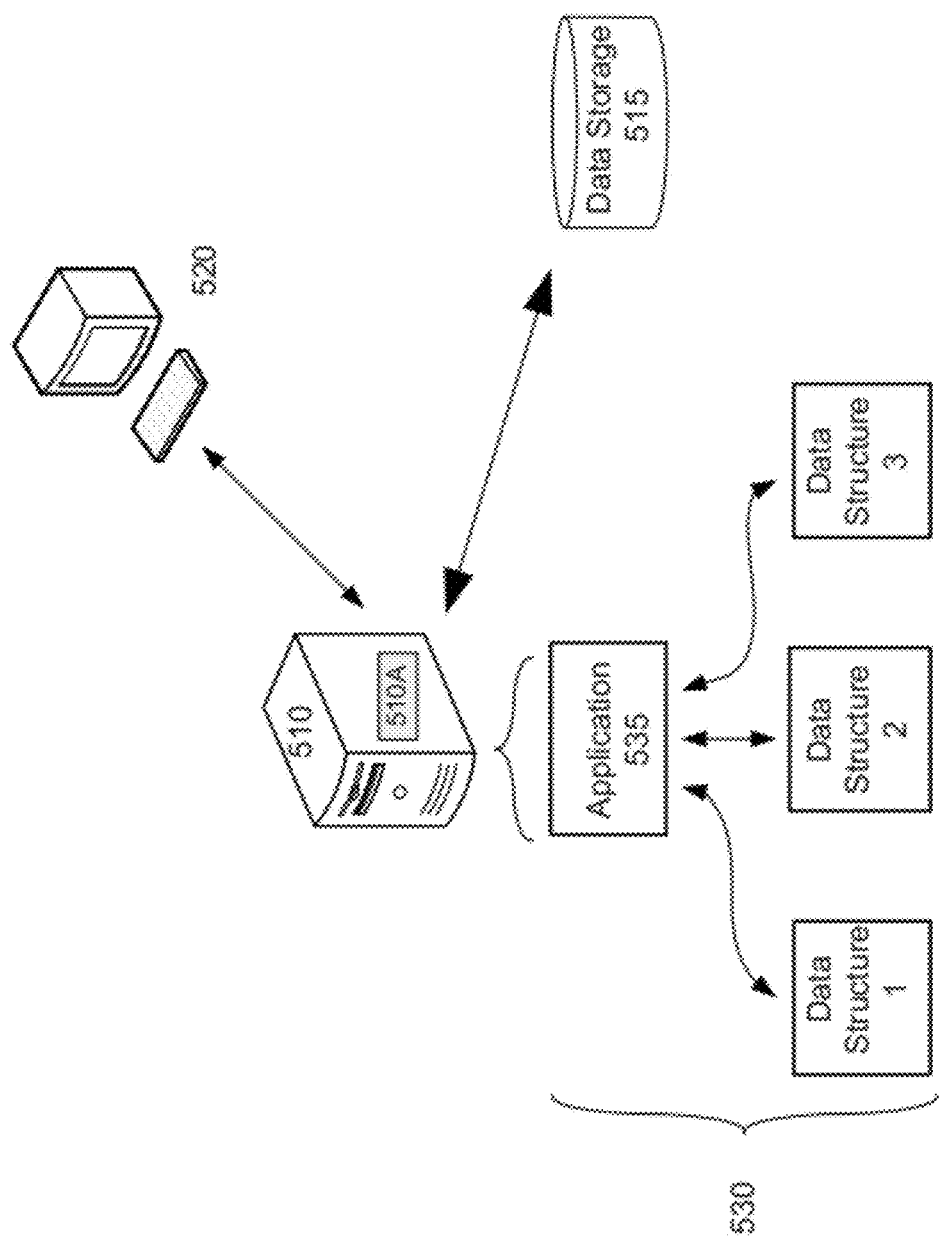

CONFLICT SWITCHES FOR IMPLEMENTATION GUIDE NODE CHANGES

BACKGROUND

The present embodiments are directed to a tool that allows users to selectively activate or implement computer application functions provided in an enhancement package into a computer application. In particular, the disclosed embodiments provide a tool that facilitates a more efficient selection of computer application functions that will be applied to the application as part of an enhancement package add-on.

Enhancement packages are used to provide updated computer application functionality and features to a user of a particular computer application, such as an enterprise resource management system or customer relationship management system. The enhancement package is structured such that a user can select which parts of the enhancement package that the user wants to install, or use after installation has occurred. As a result, both the installation of the enhancement package and the roll out of all of the updated computer application functions to the users do not have to occur substantially simultaneously. Using current systems, a user can choose when to roll out a particular computer application function. For example, in an enhancement package that is used by a number of departments within an entity, a human resources department of the entity may activate computer application functions provided in the enhancement package immediately, while an accounting department of the entity may delay activation of accounting functionality until a later date, e.g., after the end of the fiscal year. The information technology (IT) administrator, for example, can perform the activation steps for the particular department.

Enhancement packages are provided to a customer, such as a manufacturing entity or services entity. A group of data structures identifying the functions and computer objects that provide the functions are typically delivered with the computer code. The computer code and the group of data structures may be installed on the entity's computer system. A portion of the data structures may arrange in a hierarchical fashion the numerous functions that are part of the computer application enhancement. The hierarchy may be configured in the commonly known trunk, branch, node, and leaf structure. Below the nodes in the hierarchy may be computer objects, shown as leaves in the data structure, that are responsible for the implementation of a particular function. This particular data structure may be called an implementation guide. A purpose of the implementation guide is to allow easy indication of the enhancement package implementation by a user, such as an IT administrator, of the computer application functions that have been changed. In order to maintain computer application configuration management integrity as enhancement packages are introduced, changes to the implementation guide should reflect only changes to a computer application function.

The hierarchy may be used by computer system administrators to implement the enhanced functionality resulting from the enhancement changes in the computer objects. The hierarchy, when presented in a graphical user interface, allows a user to see which computer objects are affected by the selection of a particular node or leaf within the hierarchy. For example, when a department of an entity may want to implement a new computer application function provided with the installed enhancement package, a function specific to the particular department may be selected.

FIG. 1 illustrates a graphical representation of the operation of a tool for facilitating use of the implementation guide for selection of a computer function. In FIG. 1, a tool 100 presents in a graphical user interface a list of functions 110 included in the latest enhancement package and any functions that have been installed to the computer system. The user may select a function to be implemented by selecting the function in a graphical user interface by, for example, selecting a check box with an input device (e.g., mouse or keyboard) that sets an indication (e.g., inserts a checkmark) when selected by the user. As the selections are made, the graphical user interface will cause switches 1, 3 and 5 in a switch framework 120 to be activated. The selected functions may represent nodes, e.g., specific computer function XYZ, or enterprise computer function ABC, and/or specific leaves, e.g., management or recruiting. Note that more than one node, and more than one leaf may be selected. The activated switches 1, 3 and 5 may allow for implementation of the associated computer objects 150, 152, 154, 156, 158 and 160 in the list of computer objects 150 that implement the selected functions.

However, given the complex nature of an enterprise-wide computer application, the selection of particular nodes or leaves may cause conflicts with other nodes or leaves. For example, a selection of a computer object on one node may call for a software module that performs an operation that is an opposite operation performed by another computer object that has been selected by the user. In this case, the two computer objects are said to "conflict." The tool 100 may present to the user both functions even though the switches conflict.

For example, FIG. 2 illustrates a table for explaining the problem resulting from conflicting computer objects. Structure nodes (e.g. NODE 1 and NODE 2) and activities may be assigned to software switches e.g., S1 and S2, that include settings that can define how the nodes/activities may react depending upon the state (e.g., on or off separately, or both on or off simultaneously) the switches S1 and S2 are in after a particular selection. It may be possible to assign more than one switch to the same implementation guide node/activity. When two or more switches are assigned to the same implementation guide node/activity, the probability of the possible reactions to the switch state causing a conflict increases. A data structure accessible by a processor may be maintained in a data storage that tracks the assignment of particular function switches to nodes or sub-nodes and vice versa. In FIG. 2, the different combination of settings for each switch and resulting reactions at the respective nodes are shown in rows 210-240. In the illustrated example, possible reactions are 'hide' and 'show', which means the node/activity associated with the particular switch may, respectively, either be hidden (hide) from view in the user interface, or visible (show) on the user interface based on the switch setting. For example, in row 210, the switches S1 and S2 are both in a switched OFF state, and the assigned nodes NODE 1 and NODE 2, respectively, are both "HIDDEN." Rows 220 and 230 show the reactions related to the respective nodes, NODE 1 and NODE 2, when switch S1 is on and switch S2 is off, and when switch S2 is off and switch S2 is on. Switches with the reaction "VISIBLE" (i.e., show) override all switches that have the reaction "hide." In other words, one switch may cause a node to be visible and the other may cause a node to be hidden. In that case, the switch with the reaction to "show" will override the switch with the reaction to "hide." In more detail, consider the situation shown in FIG. 2:

Structure nodes NODE1 and NODE2 are sibling nodes within an implementation guide hierarchy because in the enhancement package, NODE2 is semantically a full replacement of NODE1. When the enhancements in the enhancement package are implemented, NODE2 is intended to replace NODE1.

Structure node NODE1 is assigned to switch S1 with reaction 'show' when switch S1 is switched on, and a reaction 'hide' when switch S1 is off. This means NODE1 should be hidden when switch S2 is switched on (reaction 'hide' for NODE1) because switch S2 displays the new replacement structure node NODE2.

But as mentioned above, a problem is that it is not possible to hide NODE1 with switch S2 when S1 is switched on. This is because reaction 'show' has been predetermined in the system to "win" over the reaction 'hide'.

As a result, both nodes NODE1 and NODE2 are presented (i.e., visible) to a user in the graphical user interface. The problem of conflicting computer objects in the implementation guide are typically resolved by the developers before a customer ever has the opportunity to make a conflicting selection. The developers typically implement a work around in the implementation guide to resolve the conflicts by assigning additional nodes.

To resolve the conflict, a developer may configure a "work around" to the implementation guide. For example, the developer may create a new node, say NODE3, in the implementation guide structure to address conflicting computer objects. The new node, say NODE3, may be assigned to switch S2 with a reaction to hide when switch S2 is on, and may also be the parent node of NODE1. NODE2 is also assigned to switch S2 with a reaction to show. By NODE3 being the parent of NODE1, this takes advantage of the rule that all children of a node take the same reaction as the parent. So if NODE3 is given the reaction to hide when switch S2 is on, NODE1 will also be hidden. When switch S2 is selected to be on, NODE2 is visible and presented in the graphical user interface, and NODE3 and its child, NODE1, are hidden.

The additional node (NODE3), without corresponding additional functions, can make the hierarchy of the implementation guide confusing because the additional node only addresses a specific conflict between two nodes. The confusion may be compounded by future enhancements that add further nodes that merely address node conflicts to the computer application. In addition, the configuration management protocols for the implementation guide may be compromised because changes to the implementation guide do not reflect only changes to a computer application function, but also include the switch workarounds.

An example shown in FIG. 2A illustrates a scenario in which a switch is activated and a computer function is presented in a screenshot 200A of a graphical user interface. A graphical user interface presents to a user the screenshot 200A displaying in a hierarchy the implementation guide (IMG) for an exemplary enhancement package. Elements 272 and 274 graphically represent nodes in a hierarchical data structure at which the particular nodes "User Interface Settings" and "Work Settings" may be located. Also present in the data structure may be the switches that turn "on" or activate the particular computer functions indicated by the respective nodes. In the illustrated example, the switch 276 labeled "SS1" may be a switch that activates the particular computer functions represented by nodes "User Interface Settings" and "Work Settings." Depending upon the reaction ("show" or "hide") assigned to the particular state of switch 276 name "SS1", either node "User Interface Settings" 272 and "Work Settings" 274 may be presented in the graphical user interface 200A.

An example of a workaround as presented in a screenshot 200B of a graphical user interface is shown in FIG. 2B. The node "User Interface Settings" 284 may be, in the illustrated example, semantically replaced with the new functions at node "Settings for User Interface and Process" 286. In the workaround screenshot 200B, the nodes "Process for Global Employee Management" 280, "User Interface Settings" 284 and "Work Settings" 288 are assigned to switch SS1 287, while the workaround "User Interface Settings—General" 282 and semantic replacement "Settings for User Interface and Process" 286 nodes are assigned to switch SS2 289. In the illustrated example, the "Settings for User Interface and Process" 286 computer function may be a semantic replacement for the "User Interface Settings" 284 computer function. In this case, the present example illustrates the state of the implementation guide (IMG) when switch SS1 (element 287) is "on" and switch SS2 (element 289) is "off." The workaround inserts the node 282 entitled "User Interface Settings—General" in the hierarchy as a node above the "User Interface Settings" node 284. The node 282 (and implicitly node 284 which is a sub-node to node 282) may have the reaction "hide" assigned to it, and node 286 has the reaction "show" when the switch SS2 289 is switched "on."

FIG. 2C illustrates the effect of the workaround on the graphical user interface that displays the implementation guide to the user. In the screenshot 200C, when the state of the switches 287 and 289 are both switched to "on" respectively, the workaround may be effective (i.e., the semantic replacement "Settings for User Interface and Process" replaces "User Interface Settings", and the nodes 282 and 284 may be hidden. The user will be presented with a view as shown in FIG. 2C that presents nodes 280, 286 and 288 with the indication of the respective switches 287 and 289.

As can be seen in FIG. 2B, the "workaround" solution creates an additional node, e.g., 282, which based on its name, "User Interface Settings—General" is not very descriptive of the nodes true purpose. Furthermore, if and when additional nodes are required, other names must be given to those nodes further cluttering the implementation guide and masking the purpose of the presented nodes.

Accordingly, the inventors have recognized the need for a tool that presents the implementation guide in a format absent of additional "work around" nodes that addresses the conflicting computer objects and satisfies the configuration management protocols of the implementation guide.

BRIEF DESCRIPTION OF THE DRAWINGS

FIG. 2 illustrates a table for explaining the current problem resulting from conflicting computer objects.

FIG. 4 illustrates a conflict switch table that indicates the implementation of a conflict switch according to an embodiment of the present invention.

FIG. 5 illustrates an exemplary computer system for implementing a conflict switch protocol for managing an implementation guide according to an embodiment of the present invention.

DETAILED DESCRIPTION

Figure 1:
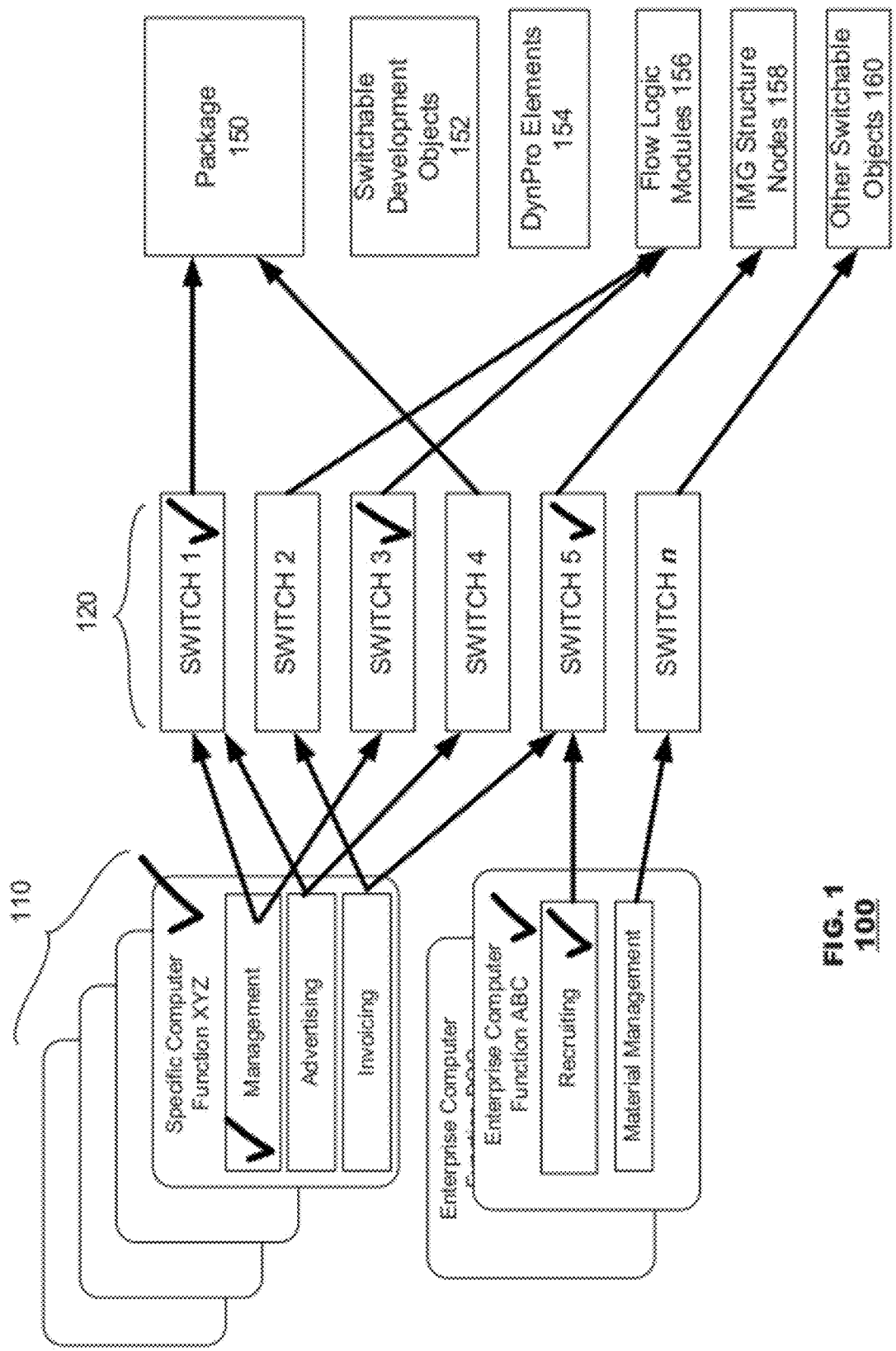
FIG. 1 illustrates a graphical representation of the operation of a tool for facilitating use of the implementation guide for selection of a computer function.

Disclosed embodiments provide an enhancement implementation analysis method. A processor may determine a node in an implementation hierarchy to be analyzed for conflicts. As a result of the determination by the processor, a list of all switches assigned to the node in the implementation hierarchy may be retrieved from a data store. The list of retrieved switches may be checked to determine whether the switch is a conflict switch. For switches determined to be a conflict switch, the processor may further determine whether the conflict switch is active. Upon a determination that the conflict switch is an inactive conflict switch, the conflict switch may be deleted from the retrieved list of all switches. If the conflict switch is determined to be an active conflict switch, the conflict switch may be added to a list of relevant switches, and the list of relevant switches may be processed to resolve conflicts.

Also, the disclosed embodiments provide an enhancement implementation analysis tool that include a display device and a processor. The display device may display a graphical user interface. The processor may be configured to construct, in response to a selection of a specific computer application function in the graphical user interface, a list of all switches assigned to the selected function. The selected function may be represented as a node in a data structure, and the node may have a plurality of leaves representing sub-functions related to the selected function. The processor may also be configured to extract individual switches from the list of all switches. All switches in the list may include function switches and conflict switches. A conflict switch may have at least two switches of any combination of function or conflict switches assigned to it and function switches are assigned to either a function or sub-function. The processor may further be configured to determine whether the extracted switch is an active conflict switch, and based on the determination that the extracted switch is an active conflict switch, add the active conflict to a list of relevant switches. After all switches in the list of switches have either been removed from the list of all switches or added to the list of relevant switches by the configured processor, the processor may process the list of relevant switches. As a result of the processing, the processor may present in the graphical user interface on the display device, an implementation guide indicating which specific computer application functions are to be executing on the processor.

In order to be able to provide this selectivity for functions within a computer application, the developers must perform more tasks during development that facilitates the selection of the new, or enhanced, functions provided by the respective changes to the computer objects of the computer application. For example, a switch enhancement framework may be implemented that analyzes the switches referred to in FIG. 1. The switch enhancement framework may provide additional capabilities beyond the current switching techniques used in other areas, such as the adaptation of source code, user interfaces, presentation of screens and application menus.

As explained with reference to FIG. 1, when a computer function is selected for implementation in a graphical user interface, a switch may be set turning on the computer objects that provide the selected functionality, related implementation guide development objects, and other objects. In the switch enhancement framework, the switches may be assigned to a particular computer application function, such as HR management or invoicing functions. These switches may be referred to as function switches. The function switches are turned on when the particular computer application function to which it is assigned is turned on. The switches may include attribute settings (e.g., flags, or identifiers) that indicate that the switch is a function switch.

The switch enhancement framework may also include switches referred to as a conflict switches. Conflict switches may be assigned to a function switch and may only be turned on when the function switch to which the conflict switch is assigned is turned on. A conflict switch may be assigned to more than one function switch, in which case, the conflict switch is turned on when all of the function switches assigned to it are also turned on. The conflict switches may also have attribute settings (e.g., flags, or identifiers) that indicate the switch is a conflict switch.

Figure 3:
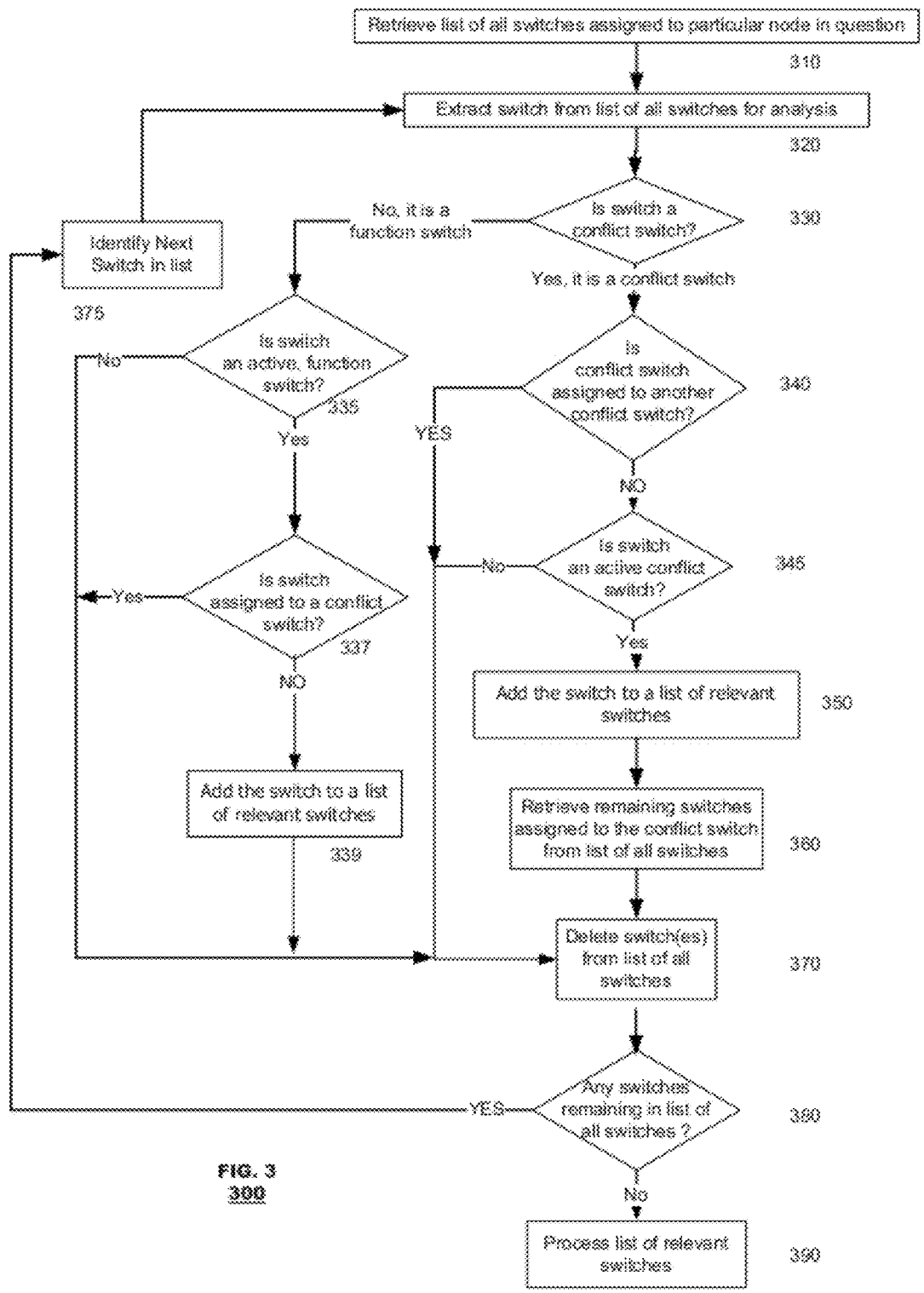
FIG. 3 illustrates a flow chart of an exemplary process according to an embodiment of the present invention.

FIG. 3 illustrates a flow chart of an exemplary process for conflict switch analysis according to an embodiment of the present invention. A user may be presented with a graphical user interface having a plurality of user control input devices (e.g., radio buttons, selectable buttons and the like) assigned to specific functions. In the conflict switch analysis process 300 executed by a processor configured as an enhancement package implementation tool, a list of all switches assigned to a node in the implementation guide may be retrieved by a processor configured as a conflict analysis tool executing on a server at step 310. At step 320, the conflict switch analysis tool may extract a switch from the list of all switches for analysis. By analyzing attributes of the switch at step 330 a decision may be made whether the switch is a conflict switch. The process 300 will follow one of two paths depending upon the decision.

In a first path, the decision at step 330 is YES, the switch is a conflict switch, the process 300 proceeds to step 340. The decision to be made at step 340 is whether the conflict switch is assigned to another active conflict switch. If the answer at step 340 is "Yes", the process 300 proceeds to step 370 to delete the conflict switch from the list of switches. Otherwise, the answer is "No, the conflict switch is not assigned to another conflict switch, and process 300 proceeds to step 345. At step 345, it may be determined whether the conflict switch is an active conflict switch. An active conflict switch may be a conflict switch that is activated when all of the function switches that are assigned to the conflict switch have been selected by a user. If the conflict switch is determined NOT to be an active switch at step 345, the process 300 may proceed to step 370, where the tool may delete the switch from the list of all switches. Otherwise, if the answer is "Yes", the process may proceed to step 350. At step 350, the conflict switch may be added to the list of relevant switches. Subsequently, the process 300 may proceed to step 360. At step 360, the tool may retrieve any remaining switches assigned to the conflict switch from the list of all switches, and, if present, from the list of relevant switches (it may be possible that a switch that is assigned to a conflict switch may be processed and added to the list of relevant switches prior to the conflict switch being analyzed). The process 300 may proceed to step 370, where the retrieved remaining switches may be deleted from the list of all switches, and, if present, from the list of relevant switches. After which the process may determine whether any switches remain in the list at step 380. If the answer is "Yes, switches remain in the list," the process 300 may identify at step 375, the next switch in the list, and the process 300 restarts at step 320. If the answer is "No, switches do not remain in the list," the process 300 proceeds to step 390 to process the list of relevant switches.

The processing of the list of relevant switches at step 390 may include executing the rules of the relevant conflict switches, and implementing the functions indicated by the conflict switches. In addition, the execution of the rules of the relevant conflict switch may cause the graphical user interface to present the functions that are indicated by the rules of the conflict switch.

Alternatively, in a second path, if it is determined from the results of the attribute analysis, at step 330, that the switch is not a conflict switch, the process 300 may proceed to step 335.

At step 335, a inquiry may be made whether the switch is an active, function switch. If the response to the inquiry is "No" at step 335, the process 300 may proceed to step 370, where the switch may be deleted from the list of all switches. Otherwise, if the response to the inquiry at step 335 is "Yes", the process 300 proceeds to step 337. At step 337, a decision whether the active function switch is assigned to an active conflict switch may be made. If the response to the inquiry at step 337 is "Yes", the process 300 may proceed to step 370, where the switch may be deleted from the list of all switches. Alternatively, if the response to the inquiry at step 337 is "No", the process 300 proceeds to step 339. At step 339, the switch may be added to the list of relevant switches. After which the process 300 may proceed to delete the active function switch from the list of all switches at step 370. Subsequently, the process 300 may continue and execute the steps 380, and either 375 or 390 as explained above.

The processing of the list of relevant switches at step 390 may include causing the graphical user interface to present the functions that are indicated by the rules of the conflict switch.

In an example, assume that switches SA and SB have a conflict. The conflict may be resolved by conflict switch CS1. Switches SA and SB are assigned to conflict switch CS1. Further assume another conflict exists between conflict switch CS1 and another switch SC. Another conflict switch CS2 may be used to resolve this conflict. Switch SC and conflict switch CS1 may be assigned to conflict switch CS2. In the process 300, the list of assigned switches may contain switches SA, SB, SC and conflict switches CS1 and CS2. Further assume that all of the switches are active (i.e., switched on). The process 300 may work through the list of switches recognizing that switches CS1 and CS2 are conflict switches. The processing of conflict switch CS1 will cause switches SA and SB to be removed from the list of all switches assigned to the particular node, while CS2 will cause switches SC and CS1 to be cleared from the list as well. Only CS2 will remain in the list of relevant switches for processing. After the list or relevant switches is processed in step 385, the process 300 may proceed to step 395, where an implementation structure, such as an implementation guide, is presented on a display device.

In an alternative embodiment, the process 300 may include a step 315 between steps 310 and 320 in which the list of all switches would be sorted. Sorting may be done, for example, where conflict switches are ordered to appear prior to function switches in the list of all switches. In this case, step 337 may not be needed as step 360 and 370 would have already deleted all function switches which are assigned to an active conflict switch.

Figure 2A:
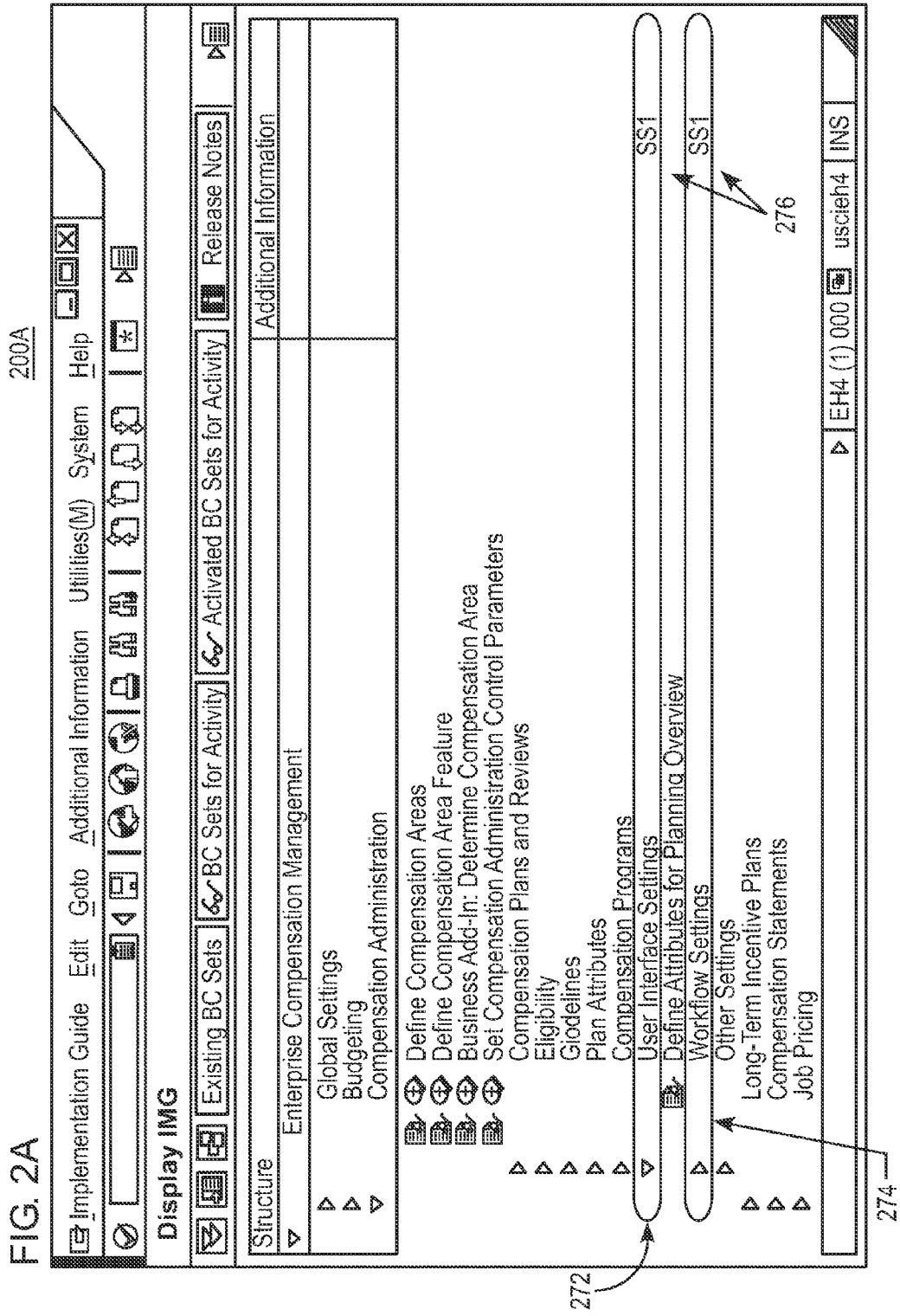
FIGS. 2A-2C illustrate exemplary screenshots of an implementation guide usable with embodiments of the present invention.
Figure 2B:
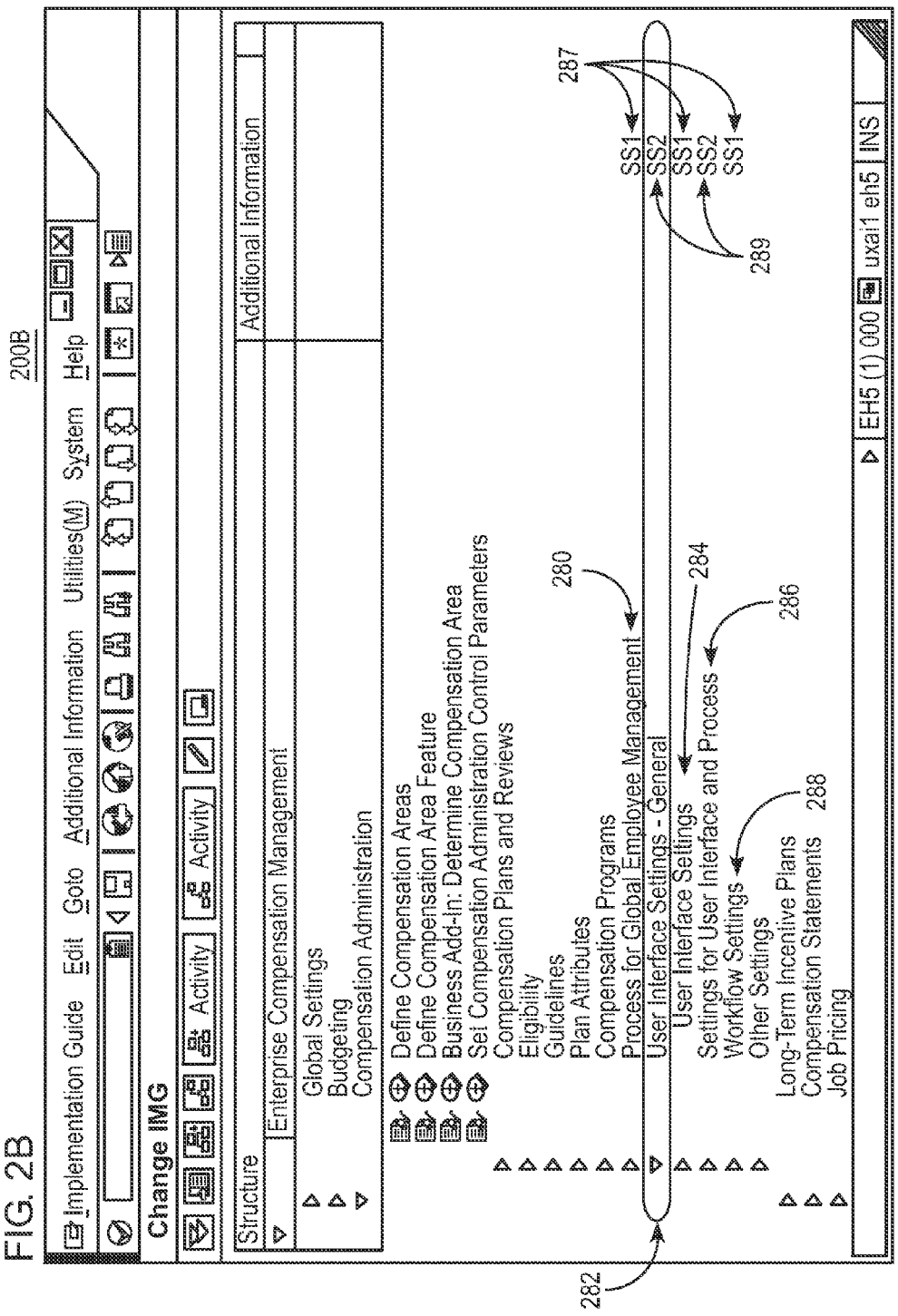
Figure 2C:
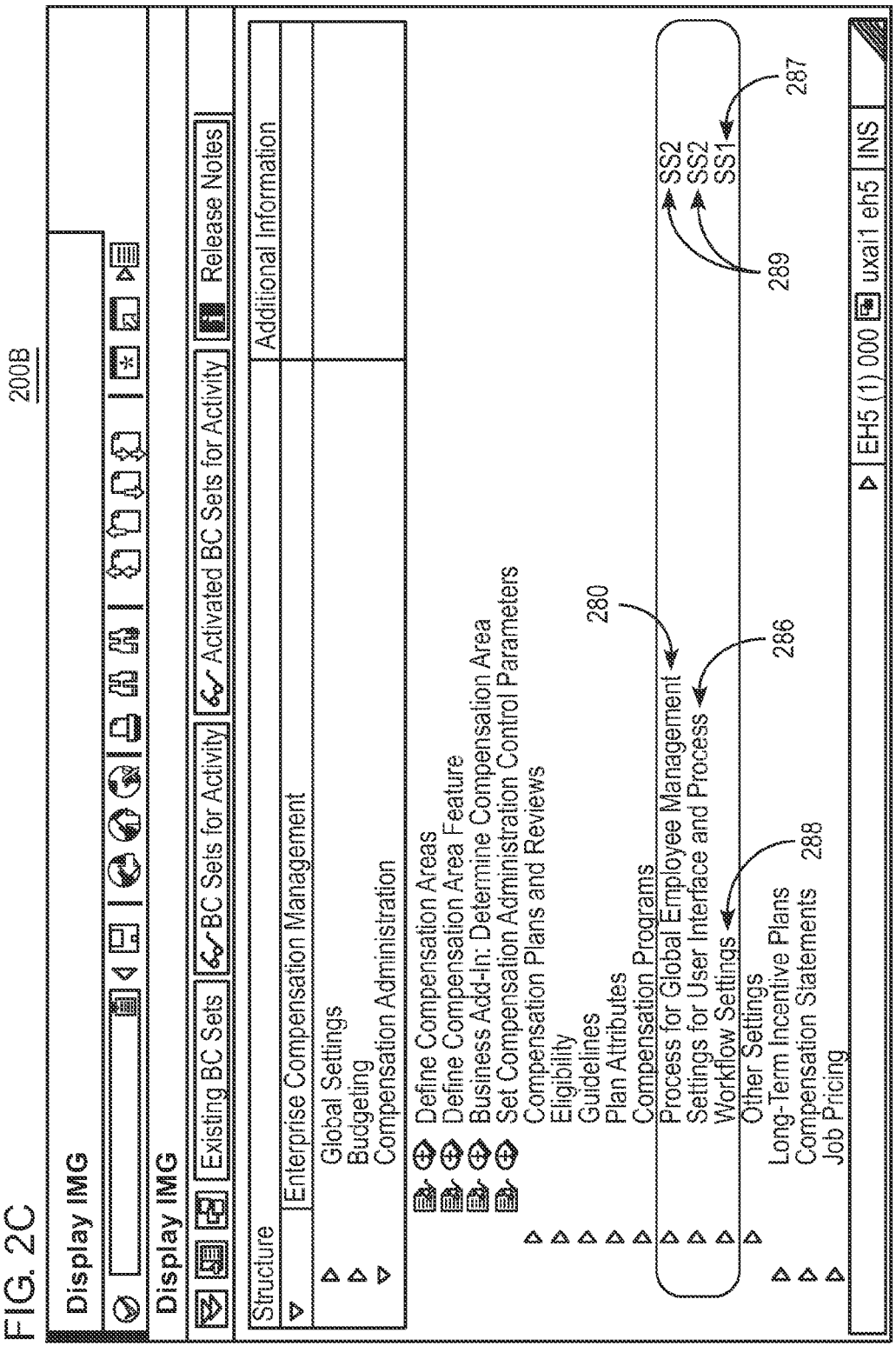

FIG. 4 illustrates a conflict switch table that resolves a conflict according to an embodiment of the present invention. Continuing with the example described with respect to FIG. 2 where switch S1 is assigned to NODE1, and switch S2 is assigned to NODE2, the conflict switch table 400 of FIG. 4 indicates the operation of a conflict switch S3 as the assigned switches S1 and S2 change state. The different states of the respective function switches S1, S2 and conflict switch S3, and the result of the states of each node are shown in rows 461-464. The selected function that activates the respective function switches S1 and S2 and conflict switch S3 may represent a node in an implementation guide data structure, wherein the node has a plurality of leaves representing sub-functions related to the selected function. The sub-functions may also be assigned to a switch, such as switch S2. In row 461 of the illustrated example, nodes NODE1 and NODE2 are hidden when both switches S1 and S2 are off. In this case, conflict switch S3 may also be off. In row 462, switch S1 is switched on, and switch S2 is switched off, which results in NODE1 being visible and NODE2 being hidden in the implementation guide viewable in the graphical user interface. Conflict switch S3 may also be off in this situation. Conversely, when, in row 463, switch S1 is switched off, and switch S2 is switched on, which results in NODE1 being hidden and NODE2 being visible in the implementation guide viewable in the graphical user interface. Conflict switch S3 may again be off in this situation. In row 464, both switches S1 and S2 are switched on, which is a conflict. However, switches S1 and S2 are assigned to conflict switch S3 in which case, the logic that controls the operation of conflict switch S3 may be set to turn conflict switch S3 on, when switches S1 and S2 are on. As a result, all switches S1, S2 and S3 are on, but NODE1 is hidden, and NODE 2 is visible.

As shown in FIG. 4, computer application functions are not assigned to conflict switches instead function and/or conflict switches are assigned to a conflict switch. A conflict switch may have a number of settings that respond to the states of one or more assigned function and/or conflict switches. To be clear, other conflict switches may be assigned to a conflict switch.

FIG. 5 illustrates a computer system in which an embodiment of the present invention may be implemented. The system 500 may include a server 510, client terminal 520, and a data storage 515. A processor 510A in the server 510 may execute the computer application 535, which is available to the client terminal 520. The computer application 535 may access a plurality of data structures 1, 2, and 3 that, for example, contain rules governing the operation of the conflict switches, include data for configuring a graphical user interface for the implementation guide, functional executable code, and other data. The data structures 1, 2, and 3 may be maintained in data storage 515. A user may interact with the graphical user interface via the client terminal 520. The graphical user interface may be presented on a display device of the client terminal 520. The processor 510A may access a data structure, such as data structure 1, to retrieve the rules governing the rules related to the switches contained in the relevant lists.

An application programming interface (API) may be used to implement processes referred to in FIG. 3. For example, the functionality of obtaining a list of switches assigned to a particular conflict switch may be implemented by a specific API developed to perform that function. In addition, a function may be developed that implements the determination of whether a switch is a function switch or a conflict switch. This function may, for example, return a TRUE when the switch in question is a conflict switch, otherwise the function may return a FALSE. Another example may be of a function that returns an answer to the inquiry of whether the conflict switch is active. The function may use an identifier of the conflict switch in question, and return a TRUE when all of the conflicting switches (both function and conflict switches) assigned to the conflict switch are activated (i.e., switched on). Of course, other functions or APIs may be needed, and the above APIs and functions are only exemplary.

The server 510 and/or the client terminal 520 may include computer readable storage media, such as RAID devices, hard disk drives, memory devices, such as USB flash memory, ROM and RAM or any other magnetic or optical storage devices that may store computer readable data, and executable program instructions, such as computer application 535 and data structures 1-3. The client terminal 520 and processor 510 may access the included computer readable storage media as well as data storage device 512. The data storage device 512 may also include hard disk drives or any other magnetic or optical device suitable for storing data and/or executable program instruction code.

Several features and aspects of the present invention have been illustrated and described in detail with reference to particular embodiments by way of example only, and not by way of limitation. Those of skill in the art will appreciate that alternative implementations and various modifications to the disclosed embodiments are within the scope and contemplation of the present disclosure.

We claim:

1. A method for selecting computer application functionality for implementation from an enhancement package, comprising:
   retrieving, by a processor in response to user selection of a specific computer application function, a list of all switches assigned to the selected function, wherein the selected function is represented as a node in a hierarchical data structure;
   extracting individual switches from the list of all switches, wherein individual switches include at least one of either function switches or conflict switches, wherein a conflict switch has at least two switches of any combination of function or conflict switches assigned to it and function switches are assigned to a function and optionally also to a conflict switch;
   determining whether the extracted switch is an active conflict switch;
   based on the determination that the extracted switch is an active conflict switch, adding the active conflict switch to a list of relevant switches;
   after all switches in the list of switches have either been removed from the list of all switches or added to the list of relevant switches, processing the list of relevant switches; and
   as a result of the processing, presenting, by the processor in a graphical user interface, an implementation guide indicating which specific computer application functions are to be executing on the processor.

2. The method of claim 1, wherein the retrieving comprises:
   analyzing by the processor, attributes of the selected function at a node or sub-node under review to identify which function switches are assigned to the node or sub-node under review;
   further analyzing the attributes of the identified function switches to determine which are assigned to a respective conflict switch, and which conflict switch is also assigned to the selected function;
   analyzing the respective conflict switch to determine if any other conflict switches are assigned to the respective conflict switch; and
   based on the results of the analysis, adding each respective conflict switch that is assigned to the selected function to the list of all switches.

3. The method of claim 1, wherein the determining whether the extracted switch is an active conflict switch, comprises:
   determining the extracted switch is an active conflict switch when all function or conflict switches assigned to the extracted switch that are switched on;
   otherwise, the extracted switch is an inactive conflict switch; and
   deleting the inactive conflict switch from the list of all switches.

4. The method of claim 1, wherein the processing the list of relevant switches, comprises:
   identifying the switch conflict resolution indicated by the active conflict switch; and
   modifying the implementation guide according to the identified switch conflict resolution.

5. An enhancement implementation analysis method, comprising:
   determining by a processor a node in an implementation hierarchy to be analyzed for conflicts;
   retrieving from a data store, as a result of the determination by the processor, a list of all switches assigned to the node in the implementation hierarchy;
   considering each switch in the list of all switches to determine whether the switch is a conflict switch;
   for switches determined to be a conflict switch, determining whether the conflict switch is active or inactive;
   upon a determination the conflict switch is an inactive conflict switch, deleting the conflict switch from the retrieved list of all switches;
   upon a determination the conflict switch is an active conflict switch, adding the conflict switch to a list of relevant switches; and
   processing the list of relevant switches to resolve conflicts.

6. An enhancement implementation analysis tool, comprising:
   a display device for displaying a graphical user interface; and
   a processor configured to:
      construct, in response to a selection of a specific computer application function in the graphical user interface, a list of all switches assigned to the selected function, wherein the selected function is represented as a node in a hierarchical data structure;
      extract individual switches from the list of all switches, wherein individual switches include at least one of either a function switch or a conflict switch, wherein a conflict switch has at least two switches of any combination of function or conflict switches assigned to it and a function switches are assigned to either a function and optionally also to a conflict switch;
      determine whether the extracted switch is an active conflict switch;
      based on the determination that the extracted switch is an active conflict switch, add the active conflict switch to a list of relevant switches;
      after all switches in the list of switches have either been removed from the list of all switches or added to the list of relevant switches, process the list of relevant switches; and
      as a result of the processing, present, by the processor in a graphical user interface, an implementation guide indicating which specific computer application functions are to be executing on the processor.

7. The enhancement implementation analysis tool of claim 6, wherein the processor is further configured to construct the list of all switches by:
   analyzing by the processor, attributes of the selected function at a node or sub-node under review to identify which function switches are assigned to the node or sub-node under review;
   further analyzing the attributes of identified function switches to determine which are assigned to a respective conflict switch and the attributes of any conflict switches to identify selected functions to which the conflict switches are assigned;
   analyzing the respective conflict switch to determine if any other conflict switches are assigned to the respective conflict switch; and based on the results of the analysis, adding each respective conflict switch that is assigned to the selected function to the list of all switches.

8. The enhancement implementation analysis tool of claim 6, wherein the processor is further configured to determine whether the extracted switch is an active conflict switch, by:
    determining the extracted switch is an active conflict switch when all function or conflict switches assigned to the extracted switch that are switched on;
    otherwise, the extracted switch is an inactive conflict switch; and
    deleting the inactive conflict switch from the list of all switches.

9. The enhancement implementation analysis tool of claim 6, wherein the processor is further configured to process the list of relevant switches by:
    indentifying the switch conflict resolution indicated by the active conflict switch; and
    modifying the implementation guide according to the identified switch conflict resolution.

10. A non-transitory computer readable medium embodied with program instructions executable by a processor, the processor performing a method for selecting computer application functionality for implementation from an enhancement package, comprising:
    retrieving, by a processor in response to user selection of a specific computer application function, a list of all switches assigned to the selected function, wherein the selected function is represented as a node in a hierarchical data structure;
    extracting individual switches from the list of all switches, wherein individual switches include at least one of either function switches or conflict switches, wherein a conflict switch has at least two switches of any combination of function or conflict switches assigned to it and function switches are assigned to a function and optionally also to a conflict switch;
    determining whether the extracted switch is an active conflict switch;
    based on the determination that the extracted switch is an active conflict switch, adding the active conflict switch to a list of relevant switches;
    after all switches in the list of switches have either been removed from the list of all switches or added to the list of relevant switches, processing the list of relevant switches; and
    as a result of the processing, presenting, by the processor in a graphical user interface, an implementation guide indicating which specific computer application functions are to be executing on the processor.

11. The non-transitory computer readable medium of claim 10, wherein the retrieving comprises:
    analyzing by the processor, attributes of the selected function at a node under review to identify which function switches are assigned to the node under review;
    analyzing the identified function switches to determine which are assigned to a respective conflict switch;
    analyzing the respective conflict switch to determine if any other conflict switches are assigned to the respective conflict switch; and
    based on the results of the analysis, adding each respective conflict switch that is assigned to the selected function to the list of all switches.

12. The non-transitory computer readable medium of claim 10, wherein the determining whether the extracted switch is an active conflict switch, comprises:
    determining the extracted switch is an active conflict switch when all function or conflict switches assigned to the extracted switch that are switched on;
    otherwise, the extracted switch is an inactive conflict switch; and
    deleting the inactive conflict switch from the list of all switches.

13. The non-transitory computer readable medium of claim 10, wherein the processing the list of relevant switches, comprises:
    identifying the switch conflict resolution indicated by the active conflict switch; and
    modifying the implementation guide according to the identified switch conflict resolution.

14. An enhancement implementation analysis method, comprising:
    determining by a processor a node in an implementation hierarchy to be analyzed for conflicts;
    retrieving from a data store, as a result of the determination by the processor, a list of all switches assigned to the node in the implementation hierarchy;
    checking the list of retrieved switches to determine whether the switch is a conflict switch;
    for switches determined to be a conflict switch, determining whether the conflict switch is active;
    upon a determination the conflict switch is an inactive conflict switch, deleting the conflict switch from the retrieved list of all switches;
    upon a determination the conflict switch is an active conflict switch, adding the conflict switch to a list of relevant switches; and
    processing the list of relevant switches to resolve conflicts.

* * * * *